United States Patent
Keenan (10) Patent No.: US 9,792,271 B2
(45) Date of Patent: Oct. 17, 2017

(54) SYSTEM AND METHOD OF MANIPULATING AN INPUTTED CHARACTER STRING TO A DIACRITIC-MODIFIED CHARACTER STRING USING A SINGLE LAYOUT FOR A CHARACTER ENTRY DEVICE

(71) Applicant: Arthur Nicholas Keenan, Ontario (CA)

(72) Inventor: Arthur Nicholas Keenan, Ontario (CA)

( * ) Notice: Subject to any disclaimer, the term of this patent is extended or adjusted under 35 U.S.C. 154(b) by 0 days.

(21) Appl. No.: 14/592,524

(22) Filed: Jan. 8, 2015

(65) Prior Publication Data

US 2015/0193411 A1 Jul. 9, 2015

Related U.S. Application Data

(60) Provisional application No. 61/924,945, filed on Jan. 8, 2014.

(51) Int. Cl.
*G06F 3/00* (2006.01)
*G06F 17/24* (2006.01)
*G06F 17/30* (2006.01)
*G06F 3/023* (2006.01)

(52) U.S. Cl.
CPC ............ *G06F 17/24* (2013.01); *G06F 3/0237* (2013.01); *G06F 17/30675* (2013.01)

(58) Field of Classification Search
CPC .... G06F 3/0237; G06F 3/0236; G06F 3/0489; G06F 17/276; G06F 3/0233; G06F 3/0219; G06F 3/018; G06F 17/2217; G06F 17/2223; G06F 3/0235; G06F 17/2276; G06F 17/24; G06F 17/30675
See application file for complete search history.

(56) References Cited

U.S. PATENT DOCUMENTS

| 4,204,089 | A | | 5/1980 | Key et al. |
|---|---|---|---|---|
| 5,952,942 | A | | 9/1999 | Balakrishnan et al. |
| 5,953,541 | A | * | 9/1999 | King ................... G06F 3/0238 710/67 |

(Continued)

OTHER PUBLICATIONS

Summons to Attend Oral Proceedings Pursuant to Rule 115(1) EPC dated Nov. 21, 2016. 8 Pages.

*Primary Examiner* — Kyle Stork
(74) *Attorney, Agent, or Firm* — James P. Muraff; Neal, Gerber & Eisenberg LLP (57) ABSTRACT

The present invention provides a method of manipulating an inputted character string to a diacritic-modified character string using a single layout for a character entry device, having the steps of: monitoring the character entry device for one or more sequential character entries, the sequential character entries including a first limiter character and a second limiter character, the first limiter character and a second limiter character defining the inputted character string there between; comparing the inputted character string to a database containing at least one modified character string, the at least one modified character string having at least one diacritic-modified character string that corresponds to the inputted character string; and replacing the inputted character string with one of the at least one diacritic-modified character string based on pre-defined replacement rules.

10 Claims, 7 Drawing Sheets

(56) References Cited

U.S. PATENT DOCUMENTS

| | | | |
|---|---|---|---|
| 6,307,548 B1 | 10/2001 | Flinchem et al. | |
| 6,340,937 B1* | 1/2002 | Stepita-Klauco | 341/23 |
| 6,377,965 B1* | 4/2002 | Hachamovitch et al. | 715/203 |
| 7,802,184 B1* | 9/2010 | Battilana | G06F 3/0236 715/256 |
| 2003/0017844 A1 | 1/2003 | Yu | |
| 2004/0230912 A1* | 11/2004 | Clow et al. | 715/773 |
| 2006/0100848 A1* | 5/2006 | Cozzi et al. | 704/5 |
| 2008/0138135 A1* | 6/2008 | Gutowitz | G06F 3/0233 400/486 |
| 2011/0202839 A1* | 8/2011 | AlKazi | G06F 3/0233 715/703 |
| 2011/0234524 A1 | 9/2011 | Longe et al. | |
| 2012/0036468 A1* | 2/2012 | Colley | G06F 3/0418 715/773 |
| 2012/0326984 A1 | 12/2012 | Ghassabian | |

* cited by examiner

SYSTEM AND METHOD OF MANIPULATING AN INPUTTED CHARACTER STRING TO A DIACRITIC-MODIFIED CHARACTER STRING USING A SINGLE LAYOUT FOR A CHARACTER ENTRY DEVICE

CROSS RELATED APPLICATIONS

The application is related to U.S. Provisional Patent Application No. 61/924,945 titled System and Method of Manipulating an Inputted Character String to a Diacritic-Modified Character String Using a Single Layout for a Character Entry Device filed Jan. 8, 2014, which is hereby incorporated by reference in its entirety.

FIELD OF THE INVENTION

The present invention pertains to the field of character entry methodology for character entry devices and in particular to diacritic character entry methodology.

BACKGROUND

Current character entry devices, such as keyboards, are primarily used for data entry and are specifically designed for specific languages. For example, a U.S. English keyboard lacks numerous diacritics that are necessary to correctly type non-English languages. In the increasingly global marketplace, the capability to type in numerous languages with typist ease is a practical issue.

A conventional approach to providing diacritics essential to a language is to utilize "national keyboards" that generate language specific accented characters. Typically, commonly used diacritical characters are assigned a unique key on the keyboard. Thus, for example, it is common to find the diacritical character "ñ" on a Spanish keyboard but not on a French keyboard since the "tilde" is not used in the French language. Similarly, the diacritical characters "à", "é" and "ù" are found on most French keyboards but not on Spanish keyboards while the diacritical characters "ä", "ö" and "ü" are found on German keyboards. However, each keyboard is designed primarily for one language. Persons who write in more than one language are required to both switch keyboards and use a different keyboard driver application tailored to the desired language, or improvise to generate the desired diacritic. One problem arising from the use of national keyboards is that even though two keyboards may contain the same characters, their positions may be quite different. Thus, the position of the "acute" and "grave" accents on a keyboard designed for France is different from that of a keyboard design for Italy. Switching keyboards requires the user to remember different keyboard layouts, a complication that potentially slows typing by the user. Further, switching keyboards requires additional keyboard driver applications as the placement of characters on the keyboard is different. Additionally, it can be challenging for multilingual users to remain proficient in entering text in different languages when having to use keyboards with different key layouts. A further complication arises when using portable equipment, in that it may be inconvenient or impossible to change the physical keyboard in portable equipment. Under such conditions, the user may have to resort to using only a mental image of a language specific keyboard layout.

Another approach includes the use of "dead keys" to obviate the need for backspacing while entering accented characters that are not assigned a unique key. It will be appreciated that the keyboard would be much too large if every possible accented character were assigned a unique key. With a dead key, the operator initially selects the dead key appropriate to the required diacritic and then selects the appropriate character key to produce a diacritical character. This dead key enters the accent but does not advance the display. Reference is made to U.S. Pat. No. 4,204,089. Only a few characters can be assigned to the dead keys, while over twenty-five different diacritical modifiers are required for European languages. In addition, some European characters use diacritics that are not modifications of existing characters but unique characters on their own. Consequently, these diacritical characters do not translate well to a "dead key" approach.

Another conventional approach to generating diacritics is to use a "compose" key, which is a key designated by the user. Pressing the compose key and then a sequence of keys causes a keyboard driver application to interpret the sequence of two or three characters as a composition: i.e., <compose>+{grave over ( )}+a=à. However, the user is required to remember many different combinations to produce the desired diacritical character, slowing the keyboard entry speed of the user.

Yet another conventional approach utilizes a repetition method. A user repeatedly presses a key to cycle through possible diacritics for the desired diacritical character. For example, one press of the letter "a" yields "a". A second press of the letter "a" yields "à". A third press of the letter "a" yields "á". A fourth press of the letter "a" yields "ä", etc. (Reference is made to U.S. Pat. No. 6,340,937.) However, the user is required to either remember where in the cycle the desired character is produced or focus on the keyboard and screen when cycling through the possible characters. This approach also slows keyboard entry speed of the user and decreases efficiency.

Therefore there is a need for a method to provide for the manipulation of an inputted character string to a diacritic-modified character string using a single layout for a character entry device.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a system and method for of manipulating an inputted character string to a diacritic-modified character string using a single layout for a character entry device. In accordance with an aspect of the present invention, there is provided a method of manipulating an inputted character string to a diacritic-modified character string using a single layout for a character entry device, having the steps of: monitoring the character entry device for one or more sequential character entries, sequential character entries including an inputted character string of at least once character and at least one trigger sequence; comparing the inputted character string to a database containing at least one modified character string, the at least one modified character string having at least one diacritic-modified character string that corresponds to the inputted character string; and replacing the inputted character string with one of the at least one diacritic-modified character string based on pre-defined replacement rules. In at least one embodiment the inputted character string comprises a single character and the at least on trigger sequence comprises a single trigger key. In at least one embodiment the at least one trigger sequence includes a first limiter and a second limiter, the first limiter and a second limiter defining the inputted character string there between. In at least one embodiment the pre-defined replacement rules comprises at least initially replacing the inputted character string with the most recently used modified character string selected to replace the inputted character string. In at least one embodiment said database comprises more than one diacritic-modified character strings corresponding to said inputted character string, and said replacing step comprises: initially replacing said inputted character string with one of said diacritic-modified character strings selected based on said pre-defined replacement rules; providing an indication to the user of said replacing; and starting a countdown time and automatically replacing the inputted character string with next possible diacritic modified character string unless a keystroke is received before expiration of timer.

In accordance with another aspect of the present invention, there is provided a method such as described above, implemented by a system comprising a control module configured to execute said monitoring steps and a processing engine configured to execute said comparing and replacing steps.

In accordance with another aspect of the present invention, there is provided a system of manipulating an inputted character string to a diacritic-modified character string using a single layout for a character entry device, having: a control module configured to monitor the character entry device for one or more sequential character entries, the sequential character entries including an inputted character string of at least once character and at least one trigger sequence; a processing engine configured to compare the inputted character string to a database containing at least one modified character string, the at least one modified character string having at least one diacritic-modified character string that corresponds to the inputted character string, wherein the inputted character string is replaced with one of the at least one diacritic-modified character string based on pre-defined replacement rules; and an interface to a communication means configured to allow communication between the control module, the processing engine, and the character entry device.

The foregoing and other objects, features, aspects and advantages of the present invention will become more apparent from the following detailed description, taken in conjunction with the accompanying drawings which description is by way of example only.

DETAILED DESCRIPTION OF EMBODIMENTS OF THE INVENTION

Definitions

The term "diacritic" is used to define any and all accents, dieresis, cedillas and other diacritical marks applied to one or more letters and or characters.

The term "limiter" includes the space key and punctuation which indicates the completion of a word and includes, but is not limited to, any of the following: space, period, comma, colon, semi-colon, bracket, square bracket, curly bracket, and any defined limiter character string defined by the method/system. Note a limiter will typically be a single character, but need not necessarily be a single character if there is a common prefix/suffix or punctuation sequence in a particular language which is more than a single character and typically denotes either the start or end of a word string.

The term "language" is used to define any language which utilizes Latin alphabet, including but not limited to, Afrikaans, Albanian, Aragonese, Asturian, Aymara, Azeri, Basque, Belarusian, Bislama, Boholano, Bosnian, Breton, Catalan, Cebuano, Chamorro, Cornish, Corsican, Croatian, Czech, Danish, Dutch, English, Esperanto, Estonian, Faroese, Fijian, Filipino, Finnish, French, Frisian, Friulian, Fula (Pulaar), Gaelic (Scottish), Galician, German, Gikuyu, Guarani, Haitian, Hausa, Hawai'ian, HitiMotu, Hungarian, Icelandic, Ido, Igbo, Ilocano, Indonesian, Interlingua, Innuaimun, Irish, Italian, Javanese, Judeo-Spanish, Khasi, Kinyarwanda, Kirundi, Kongo, Kurdish (Kurmanji), Latin, Latvian, Laz, Leonese, Lingala, Lithuanian, Lombard, Luganda, Luxembourgish, Maori, Malagasy, Malay, Maltese, Manx, Marshallese, Moldovan, Montenegrin, Nahuatl, Nauruan, Navaho or Navajo, Ndebele (Northern), Ndebele (Southern), Norwegian, Occitan, Oromo, Palauan, Polish, Portuguese, Quechua, Romanian, Romansh, Samoan, Scots, Serbian, Seychellois creole, Shona, Slovak, Slovene, Somali, Sotho (Northern), Sotho (Southern), Spanish, Swahili, Swedish, Swati, Tagalog, Tahitian, Tatar, Tetum, Tok-Pisin, Tongan, Tsonga, Tswana, Turkish, Turkmen, Turoyo, Uzbek, Venda, Vietnamese, Volapük, Võro, Walloon, Welsh, Wolof, Xhosa, Yoruba, Zulu, and Zazaki.

The term "character entry device" is used to define any means by which characters may be inputted into the system modules (for example the control module and/or processing module). Examples of a character entry device include, but are not limited to, a keyboard, a mobile phone character input device, and a touchscreen hardware device with character input selection (e.g., a tablet, mobile phone, personal computer, etc.).

The term "system administrator" is used to define any controller, real or virtual, which sets parameters for all operations of the system and method.

The term "user" is used to define any entity, real or virtual, which utilizes any of the operations of the system and method, and will sometimes be referred to herein as "typist".

The "home position" is the hand placement for a standard QWERTY keyboard with fingers of left hand having a default position on ASDF and the fingers of the right hand having a default position on JKL; and the thumbs resting on the space bar.

A "trigger key" is one of the conventional typewriter keys defined by the user during initialization of the system and method. Typically, a trigger key would be defined as any shift key activated by itself (as opposed to activated in conjunction with another key for its conventional use of designating an upper case character).

Unless defined otherwise, all technical and scientific terms used herein have the same meaning as commonly understood by one of ordinary skill in the art to which this invention belongs.

Method and System Overview

The present invention provides for a system and method for manipulating an inputted character string to a diacritic-modified character string using a single layout for a character entry device. This may be accomplished by the implementation of an integration of hardware and software to allow for a character entry device, such as a keyboard, to provide for character string input with correct diacritic modifiers in place while allowing the typist to retain an efficient typing scheme with minimal displacement, thus allowing for a more efficient method of typing.

The method allows for a consistent approach for typing irrespective of the language chosen such that the typist need not learn each of the discrete language key mappings before typing in a selected language. This allows for the standard character device entry layout to be utilized for a myriad of languages without the prerequisite of learning key mappings.

Furthermore, as this is a character-string based system and method the application for such a system and method may involve for modifications to occur post typing of the character string. The system and method provide for various implementations which aid in the correct selection of the diacritic-modified character string including predictive substitution, for example, based on typist history of replacement of that specific character string.

In at least one embodiment, the system and method may be implemented by means of a software application. The typist interacts with the application sending key entries intercepted by identified system calls at the kernel level to fully execute the system and method.

The system and method may be implemented by any means known in the art including local installation of a software application on a mobile device with minimal retrieval of extraneous data from server. In at least one embodiment, the software application is a "thin client" on the subscriber module and retrieves substantial amounts of information from server. In at least one embodiment, the software application is accessed through a network client (e.g., web browser, third party aggregator application). In at least one embodiment, the implementation of the application may include a hybrid of conventional paradigms such as those described above.

System Modules

Figure 1:
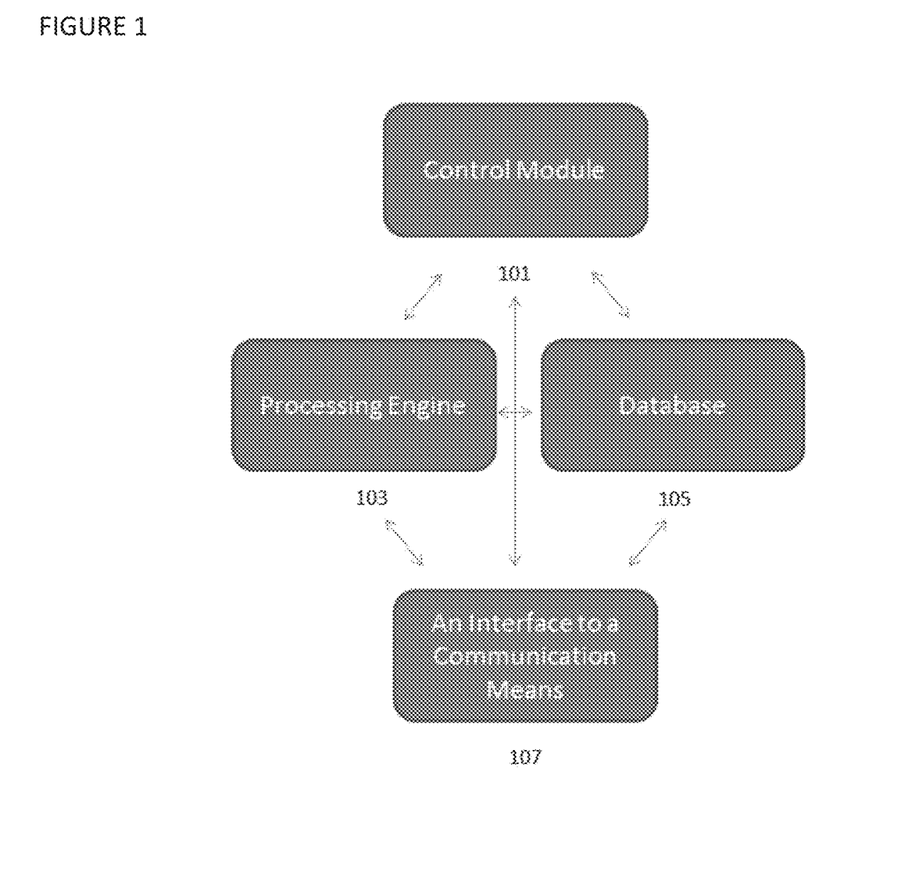
FIG. 1 is a block diagram illustrating an example of a system module implementation, according to an embodiment.

The system and method requires a number of different modules which are configured to carry out discrete operations to accomplish the manipulation of an inputted character string. FIG. 1 is an example of a system configuration with a control module (101), a processing engine (103), a database (105), and an interface to a communication means (107).

A control module is implemented which functions to monitor the character entry device for one or more sequential character selections. The control module may be a combination of a number of hardware components such as random access memory, one or more cores of a central processing unit, one or more buses, etc. The control module monitors system calls for the attached character entry device. When a character entry is executed, the control module receives the character and records the character selection in a buffer. For example the control module is engaged once a first limiter character is monitored (for example a space character). The control module retains the buffer of characters until a second limiter character is monitored; upon the second limiter character being monitored the control module assigns all the recorded sequential characters since the first limiter character as an inputted character string. The inputted character string is then sent to a processing engine for potential additional operations. The control module may be any hardware readily understood in the art which functions to receive the input information from the character entry device for the system.

A processing engine is implemented which functions to compare and replace the inputted character string with at least one diacritic-modified character string based on predefined replacement rules. The processing engine may be a combination of a number of hardware components such as random access memory, one or more cores of a central processing unit, one or more buses, etc. In at least one embodiment, the processing engine may be a discrete piece of hardware. In at least one embodiment, the processing engine may be the same hardware as the control module performing discrete operations.

An interface to a communication means is implemented allowing for the control module, processing engine, and character entry device to interact with each other through an electronic communication medium. This medium may be of any electronic medium such as one or more buses contained between shared hardware components. For example, the control module may send information to the processing engine through a bus on a common motherboard. In another example, the information from the control module is sent to the processing engine, but requires the information be sent over a network as both the control module and processing engine are discrete pieces of hardware. Communication means would be understood by a person skilled in the art to include any necessary elements of hardware, including but not limited to communications ports, buses, memory, wireless transmitter/receivers, wires or fiber optics; and software, including but not limited to telephony, e-mail, facsimile, Bluetooth, RTM., NFC, TCP/IP, FTP, XML, and IRC, that allow a network enabled device to exchange data packets with another computing device electronically.

System and Method Functionalities

The system and method may function in a variety of configurations to accomplish various features of the system. A particular embodiment of the general procedure of manipulating an inputted character string to a diacritic-modified character string can be seen in FIG. 2. Initially the control module will monitor for character entry device sequential character entries (201), and in particular for sequential character entries including an inputted character string of at least once character and at least one trigger sequence. Alternatively the control module can simply pass all keystrokes to the processing engine which monitors for the trigger sequence. The trigger sequence can include a trigger key. So for example, the sequential character entries may include a single character and a trigger key. In one embodiment, the trigger key can be the shift key (pressed by itself after the pressing of the single character, to distinguish from the entry of the corresponding upper case character resulting from pressing the shift key and the character key at same time). Alternatively, the trigger sequence may include a first limiter character and a second limiter character, the first limiter character and a second limiter character defining the inputted character string there between, which is useful for replacing an entire word. In such a case, the control module pays attention to the use of limiter characters to define the start and the end of an inputted character string as sequential character entries are inputted. In at least one embodiment, the limiter characters are defined by the system administrator. In at least one embodiment, the limiter characters are defined by the user. The inputted character string is a collection of sequential character selections between a first and subsequent limiter character; for example, the limiter characters can be the "space" key. In at least one embodiment, monitoring the character entry device is done through system calls. In this way the operations of the method and system are available for all native operating system applications thus negating the need for individual Application Programming Interfaces for every application. For example, in the Microsoft Windows® operating system the monitoring may be implemented through the use of the SetWindowsHookEx function provided by the Microsoft Windows® operating system.

Figure 2:
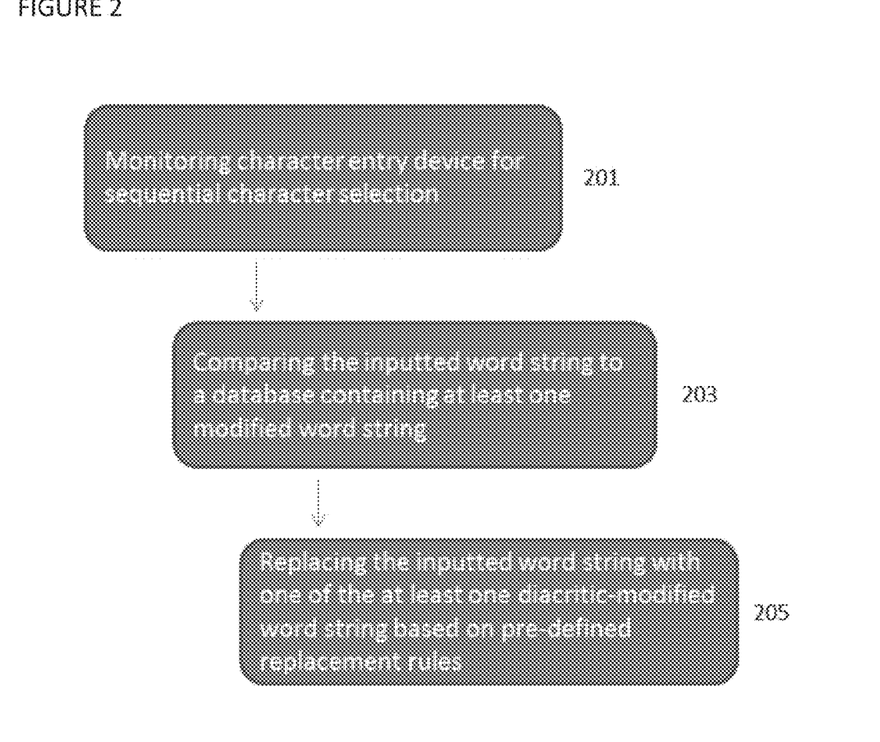
FIG. 2 is a flowchart illustrating an example of a method of manipulating an inputted character string, according to an embodiment.

The inputted character string is then compared to a database containing possible combinations of diacritic-modified character strings that correspond to the inputted character string (203). The database contains one or more combinations of the inputted character string in all configured languages. In at least one embodiment, the database is populated from third party dictionaries for one or more languages. In at least one embodiment, the database will access the relevant sub-set of diacritic-modified character strings that correspond to the inputted character string based on initial language selection. In at least one embodiment, the database uses third party data sets. In at least one embodiment, the comparison involves the following analysis: reviewing each character of the inputted character string and verifying whether any diacritic put on each character match a defined word in the database. For example, if the language selection was French and the inputting character string was defined as "cote", the following matches would be retrieved by the database based on comparison:

| inputted character string | diacritic-modified character string |
|---|---|
| cote | côte |
|  | côté |
|  | coté |

The replacement of the inputted character string with one of the at least one diacritic-modified character string is based on pre-defined replacement rules (205). In at least one embodiment, the rules are set by the system administrator. In at least one embodiment, the rules are set by the user.

In at least one embodiment, the pre-defined replacement rules includes the replacement of the inputted character string based on the last used utilized diacritic-modified character string for the inputted character string based on past user history. For example, the inputted character string "cote" would automatically generate as "côte" once the second limiter character is detected, as "côte" has been selected previously by the user. In at least one embodiment, a memory is kept of the user's last selected diacritic-modified character string in the database associated with the user. In at least one embodiment, for cases where there is more than one database entry for an inputted character string, the system re-orders the entries according to the following rules. The first entry is the entry last selected by the user. The next entry is the most frequently selected entry by the user. The next entries are ranked according to frequency of use within the selected language.

In at least one embodiment, the pre-defined replacement rules includes the replacement of the inputted character string based on the most frequently utilized diacritic-modified character string for the inputted character string based on past user history. For example, the inputted character string "cote" would automatically generate as "côte" once the second limiter character is monitored, as "côte" has been selected previously by the user based on a pre-set threshold defining frequency percentage. In at least one embodiment, the pre-set threshold may be adjusted by either the system administrator or the user. In at least one embodiment, a memory is kept of the user's selected diacritic-modified character string history in the database associated with the user such that the relevant metrics may be calculated to determine the percentage of usage.

| inputted character string | diacritic-modified character string | % of usage based on user history |
|---|---|---|
| cote | côte | %50 |
| cote | côté | %24 |
| cote | coté | %20 |

In at least one embodiment, the pre-defined replacement rules includes the replacement of the inputted character string based on the most likely diacritic-modified character string based on general usage probability. For example, the inputted character string "cote" would automatically generate as "côte" once the second limiter character is monitored, as "côte" is the highest used diacritic-modified character string given the inputted character string. In at least one embodiment, the general usage probability is implemented from integrating third party metrics and statistics for linguistics. In at least one embodiment, the general usage probability is generated by making anonymous all information for aggregate users and calculating the aggregate general user probability for each inputted character string and applying this probability for each user.

| inputted character string | diacritic-modified character string | General Usage Percentage |
|---|---|---|
| cote | côte | %45 |
| cote | côté | %35 |
| cote | coté | %20 |

In at least one embodiment, the pre-defined replacement rules includes the replacement based on the most likely diacritic-modified character string for the inputted character string based on likelihood of the diacritic-modified character string relative to the other words in the sentence. This logic may be implemented proprietarily in a series of weighted averages of words in a sentence, or integrated from third party word analytics. For example, the inputted character string "cote" would automatically generate as "côte" once the second limiter character is monitored, as "côte" is the highest probability match given the other words in the sentence.

| inputted character string | diacritic-modified character string | Percentage of Replacement based on words in Sentence |
|---|---|---|
| cote | côte | %17 |
| cote | côté | %63 |
| cote | coté | %20 |

Figure 3:
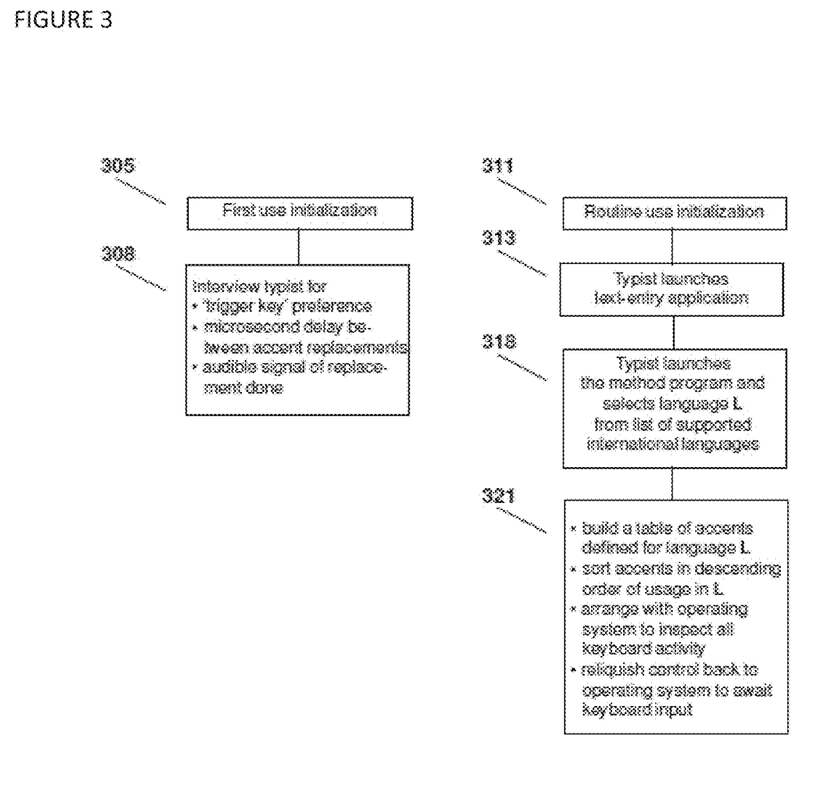
FIG. 3 is a flowchart illustrating an example of system initialization, according to an embodiment.

FIGS. 3-7 are flow charts illustrating method steps executed by a control module according to an embodiment. FIG. 3 is a flow chart illustrating initialization steps. When first used 305, the system would seek input from the user (also referred to herein as "typist") to determine preferences 308. For example while embodiments would use the shift key as the default key, the user may select an alternate trigger key. Similarly both a typist delay representing the number of microseconds used in a timer delay between accent replacements, and audible indications, both of which will be discussed below can be set or changed from a system default setting to match a user preference. While the above are indicated as first use initialization steps, the user can adjust these preferences at other times. During routine use initialization 311, the user launches the application 313 and selects a language 318 from a list of supported languages. Database updating, if necessary occurs to build (or update) a table of diacritical characters (and words) for the selected language, and sorts each accent based on usage 321. The application will arrange with the operating system to be able to inspect all keyboard activity, and then relinquish control back to operating system while waiting for keyboard input.

Figure 4:
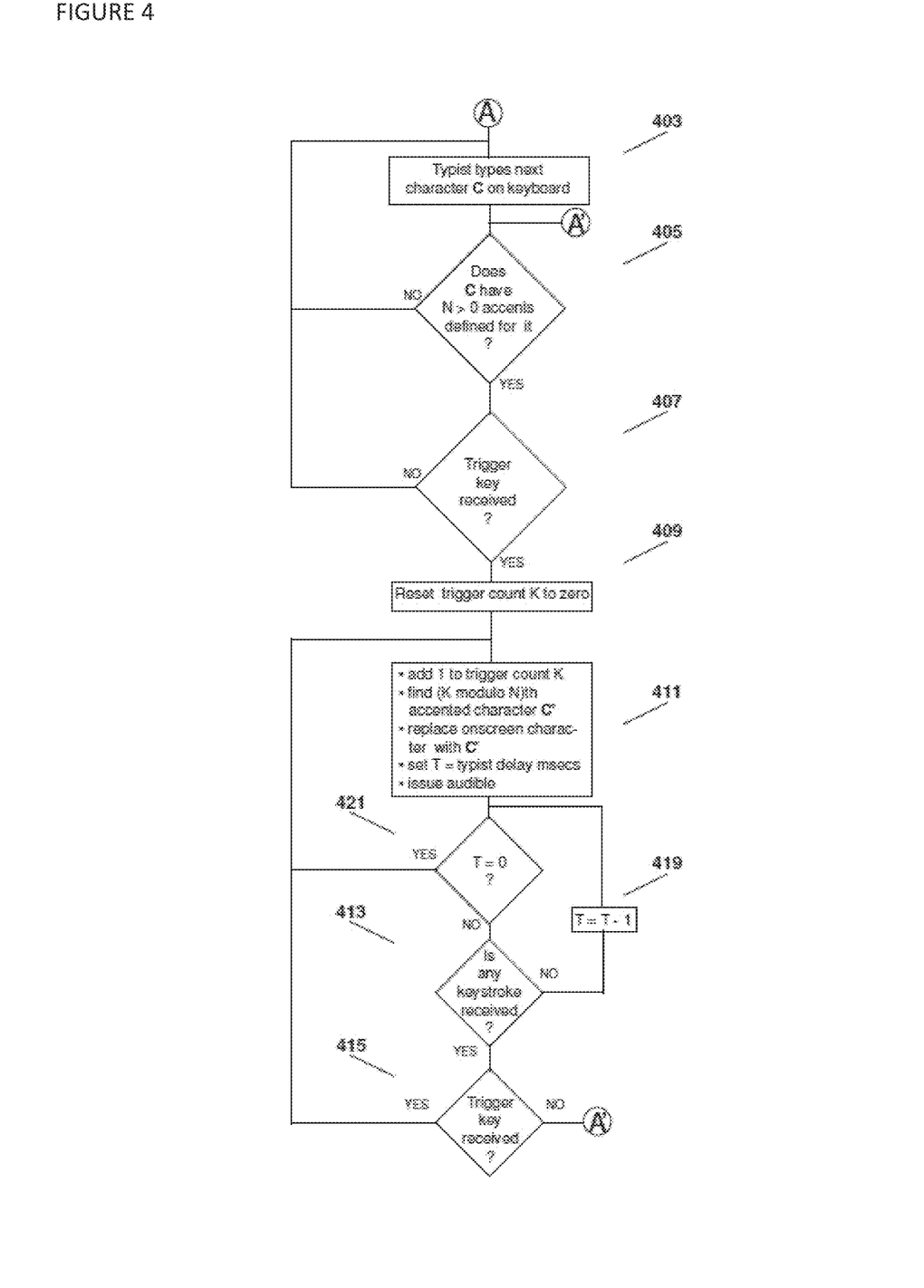
FIG. 4 is a flowchart illustrating an example of replacing a single typed character with a replacement diacritical character, according to an embodiment.

FIG. 4 is a flowchart for steps executed by a control module according to an embodiment for selecting individual diacritical characters. The user types a character C on the keyboard, which is received by the system 403. The system evaluates the character to determine if there are any diacritical characters in the database corresponding to the received character C 405, with N being the number of possible corresponding replacement characters in the database. If not, the system awaits the receipt of the next character. Otherwise the system determines if a trigger key is received 407. Typically this will be the shift key pressed on its own, but as stated above, this can be modified if preferred.

If the trigger key is received, the system will automatically replace the typed character C with its diacritical replacement, if there is only one such replacement (i.e., N=1) in the database (not shown). FIG. 4 illustrates an example of how the system will select the appropriate diacritical character when character C has more than one possible replacement in the database (N>1), according to an embodiment. In this embodiment, the system will automatically replace the character with the diacritical character last selected by the user, on the assumption that the most recently selected character is an indication of the most likely replacement wanted by the user. The system will then cycle through the possible replacements, such that the typist only needs to enter a single key to choose the desired option. In the embodiment illustrated, a reset trigger count K is set to zero 409. The system then increments K, and automatically replaces the onscreen character C with C' chosen to be K modulo Nth accented character 411. The system also provides an indication to the user of the replacement. This can be either a visual indication (e.g., a flashing of the character on the screen) and/or an audible tone. The system will also set a timer T equal to a previously selected value to represent a delay for how long the system will wait for a user input before automatically replacing the onscreen character with the next possible value which occurs when T is decremented 419 to zero 421 without receipt of a keystroke 413. If a keystroke is received the system will determine if it is a trigger key (indicating the user wishes to cycle to another potential replacement) 415, otherwise the system reverts to A' to evaluate the character received. The modulo entry is used such that if the user accidentally hits the trigger key when the appropriate character is selected, or fails to hit the trigger key in time, the system will repeatedly cycle through the possible entries in the database. It should be appreciated that as an alternative, the system could simply reset K to zero should K exceed N.

Thus with a single additional keystroke, and without requiring the typist to reach for the mouse or move hands from "home position" on keyboard, the system enters the correct diacritical character. Further, the use of an audible indication means the user need not move eyes from a document that they are transcribing if the audible indication reflects the accent. In at least one embodiment, the diacritical characters are presented in order of likelihood of use, based on percentages similar to those discussed with reference to the tables set out above, such that the first replacement is the last used replacement, then the next cycle will replace with the next most likely candidate, etc.

Figure 5:
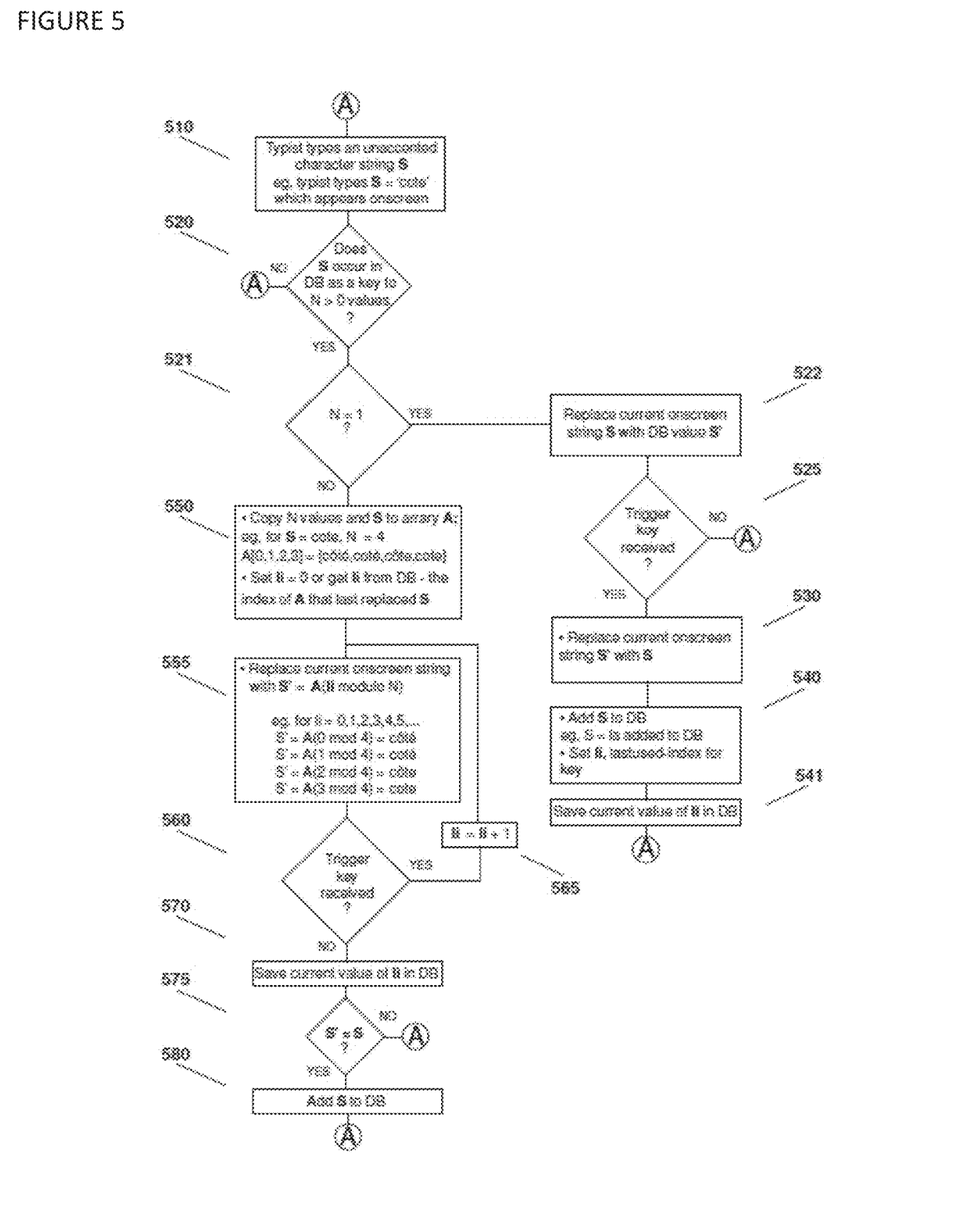
FIG. 5 is a flowchart illustrating an example of replacing a typed word with a corresponding replacement with diacritical characters, according to an embodiment.

FIG. 5 is a flowchart illustrating an example of replacing a typed word with a corresponding replacement with diacritical characters, according to an embodiment. In step 510 the system receives a word string S entered by the typist 510. In this example, the trigger sequence includes a first limiter character and a second limiter character, the first limiter character and a second limiter character defining the inputted character string there between. Often both limiters are the space key, but certain punctuation marks can also act as a limiter to define a word string. The system then determines if the database includes any replacement values for S 520. If not, the system returns to (A) to await receipt of the next word string. Otherwise the system determines if there is a single replacement (N=1) 521. If there is, then it automatically makes the replacement of S with S' 522. The system then returns to A to await the next string unless the trigger key is received 525. If the trigger key is received this indicates the user did not wish to replace the string S with S' and then replaces the current onscreen string S' with the originally inputted string S 530. The system then adds S to the Database (DB) 540. As the DB now has more than one entry for S, namely S and S', N will now equal two for this particular string going forward. Further as N>1 the system will now need to determine which of N>1 strings to use going forward, so it sets a last-used index (Li) to S, to indicate that the last used diacritical replacement for S was itself (namely S, with S' being the next entry).

If the decision at 521 is N>1, the system needs a way of selecting between the alternative replacements. The remaining steps illustrate one method of selecting between these alternatives, according to an embodiment. In this example, the system will automatically replace the inputted character string S with the last used (by the user) value, and then cycle through the alternatives for each trigger key entry received. Accordingly, in this example, the system copies N values to Array A 550. In this example, S=cote, N=4 and A[0,1,2,3]= {coté, côte, côté, cote}. The system then retrieves the value of Li from the DB to be the index of A that user last selected to replace S. The system then replaces S with this value 555, namely replaces current onscreen string with S'=A(Ii modulo N).

eg. for li=0,1,2,3:
S'=A(0 mod 4)=côté
S'=A(1 mod 4)=coté
S'=A(2 mod 4)=côte
S'=A(3 mod 4)=cote If a trigger key is received 560 the system increments Li 565 in order to cycle through the different possible replacements. As stated above, the modulo is taken to repeatedly cycle through the options, such that if the user accidentally hits the trigger key an incorrect number of times, the system will cycle back through the 4 options (in this example). If no trigger key is received at 560 (for example after the expiration of a timer, or after receiving a character input from the keyboard other than the trigger key) then the currently selected version is kept, and this value of Li is saved in the database 570. The system then checks to see if the string selected by the user S' equals the originally inputted string S. If so 575, and assuming S was not already in the database, then S is added to the database 580. Either way, the system reverts back to (A) to process the next string.

Note to avoid cluttering the figure, no timer or audible indication is shown, as was illustrated in FIG. 4. However it should be appreciated that either or both can be used for replacement of words as well as individual characters. Further, as stated above, Li could be reset to zero once it exceeds N as an alternative to using the modular arithmetic. Further, a different counter could be used rather than Li in the loop, such that the system retains its knowledge of the last used index. In at least one embodiment, the replacements are presented in order of likelihood of use, based on percentages similar to those discussed with reference to the tables set out above, such that the first replacement is the last used replacement, then the next cycle will replace with the next most likely candidate, etc.

So generalizing, if the database includes N diacritic-modified character strings that corresponds to the inputted character string, the possible replacements comprise the Array A [0, 1, . . . N−1]. The system initially replaces step the inputted character string with A[Li], wherein Li represents the last-used index for that Array. The system then automatically replaces the inputted character string with next possible diacritic modified character string by replacing the inputted character string with the string represented by A(Li modulo N), where Li is incremented by one for each timer expiration or trigger key received.

Figure 6:
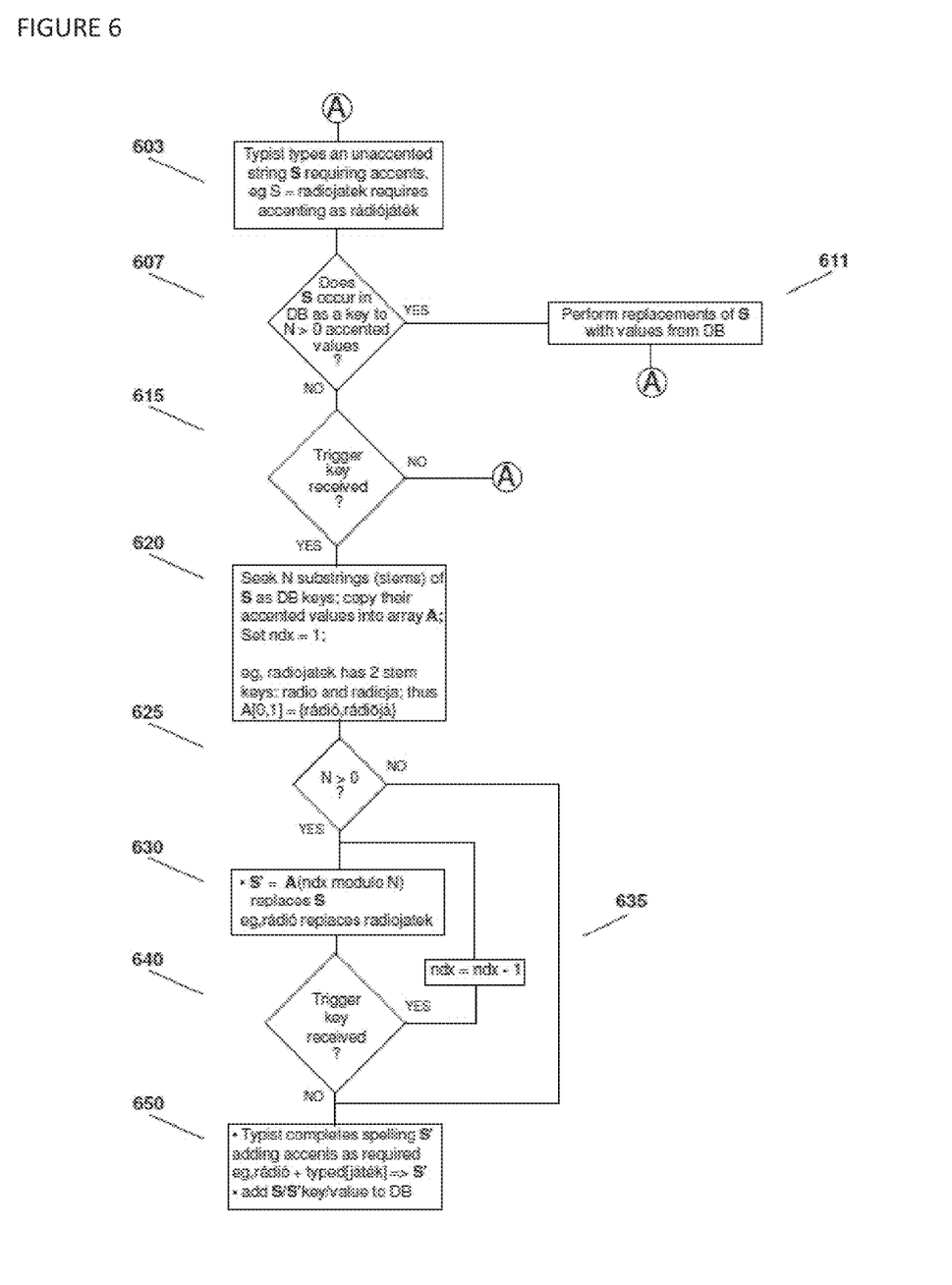
FIG. 6 is a flowchart illustrating an example of replacing a typed word with a corresponding replacement word stem with diacritical characters, according to an embodiment.

FIG. 6 is a flowchart illustrating an example of replacing a typed word with a corresponding replacement word stem with diacritical characters, according to an embodiment. In this example, we will discuss how a user can type an unaccented string S requiring accents; e.g., S=radiojatek requires accenting as rádiójáték, such that the system receives S=radiojatek 603. The system first checks to see if "S" occurs in the DB as key to N>0 values 607. If it does, the system performs the replacement procedure of S 611 as shown in FIG. 5. However if S does not exist in the database, the system allows the user a shortcut method of adding the diacritical characters in response to the trigger key 615. If the trigger key is not received, for example after the expiration of a timer, or after receiving a character input from the keyboard other than the trigger key, the system reverts to A. In this case, if the user still desires "rádiójáték" the user would then backspace over radiojatek and retype it adding required accents manually using the method shown in FIG. 4.

Assuming the trigger key is received 615, the system then searches for substrings or stems of S which would facilitate the user entering the correct diacritical spelling. Accordingly the system seeks N substrings (stems) of S as DB keys and copies their accented values into array A 620. The system also initializes a counter ndx=1. For example, let us assume the database includes 2 stems: rádió and rádiöjá; thus A[0,1]={rádió,rádiöjá}.

The system then determines whether N (the number of stems found)>0 625. If it doesn't the system will either replace S with the single stem (if N=1) or delete S (as not stems are found), and prompt the user to complete the desired string S' by manually typing any remaining characters 650 (which will be the entire string if no stem is located). If N>1 then the system replaces S with the one of the stems, and increments the value of ndx 635 if the trigger key is received 640 (implying the user wants to use another stem). Once no trigger is received, the system receives further character entries from the typist to complete S' (for example, using the approach illustrated in FIG. 4) and once a limiter character is received, adds the final version of S' to the DB 650.

While not shown, this approach can be extended in some embodiments to allow a different trigger key to be used if the user enters a stem and wants the system to replace the stem with a longer word which includes the stem.

Figure 7:
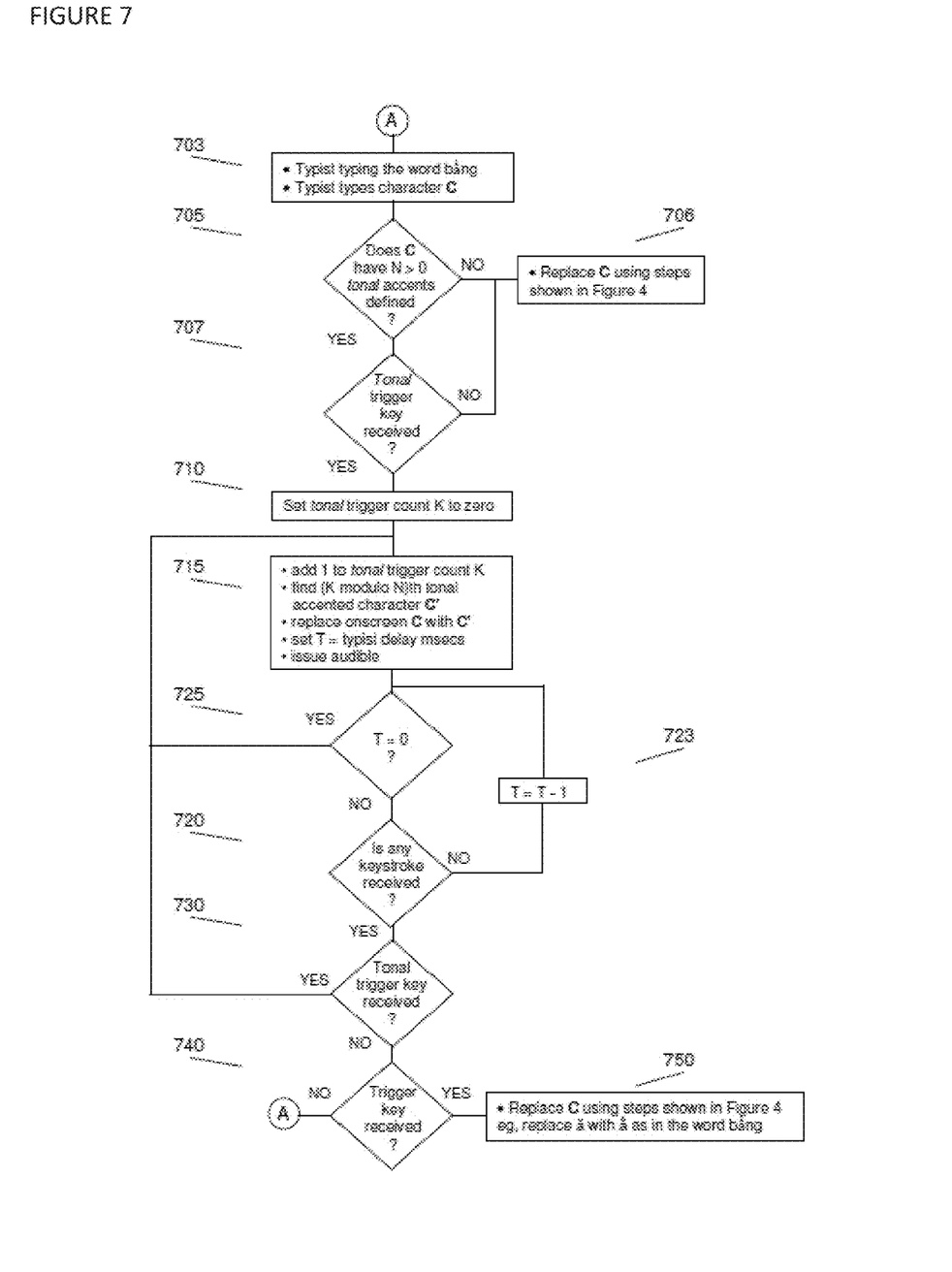
FIG. 7 is a flowchart illustrating an example of entering tonal characters, according to an embodiment.

FIG. 7 is a flowchart illustrating an example of entering tonal characters, according to an embodiment. This is useful for entering diacritical characters in languages which use tonal characters, e.g., Vietnamese. In this example, the accents for the character "a" are organized into 3 tonal groupings, namely:

| Tonal character | a | â | ă |
|---|---|---|---|
| Accented tonal | aàáạảã | âầấậẩẫ | ăằắặẳẵ |

Similarly, the accents for the character "o" are organized into 3 tonal groupings, namely:

| Tonal character | o | ô | ơ |
|---|---|---|---|
| Accented tonal | oóọòỏõ | ôộốồổỗ | ơớợờởỡ |

Further, it should be noted that the above is for the lower case, and there are corresponding upper case characters. Accordingly an embodiment allows for setting the system to a language which includes tonal diacritical characters, with more than one accent for at least some tonal diacritical characters. The system can produce any single character by:
  Receiving a first trigger sequence consisting of a tonal trigger key;
  First selecting one of said tonal diacritical characters for said inputted single character; and
  Then selecting an accent for said tonal diacritical character.

Accordingly, turning to FIG. 7, we look at the example of the receiving a character C=a, which in this example, is part of the word bâng 703. The system determines whether C has N>0 tonal accents defined 705. If it doesn't the system replaces C 706 using the steps shown in FIG. 4. If there are tonal accents, and the system receives a tonal trigger key input from the user 707, the system first determines the appropriate tonal base character. It should be noted that the tonal trigger key can be set in advance. In one default embodiment, for a language involving tonal characters, the "left" shift key can be configured as the "normal" trigger key, whereas the "right" shift key can be configured as the tonal trigger key.

The system then initializes a tonal trigger count variable K to zero 710. Then the system performs the following 5 steps 715:
 add 1 to tonal trigger count K
 find (K modulo N)th tonal accented character C'
 replace onscreen C with C'
 set T=typist delay msecs
 issue audible and/or visual indication It should be noted that changing the accent is a visual indication, so an audible indication is typically used. However, if desired, the system could flash the changed character(s) as an additional visual indication to the user.

The system then cycles through the possible tonal characters until one is finally selected by the sure by determining if any keystroke has been received 720 while the timer T counts down 723 until the timer T reaches zero 725, at which point K is incremented and the loop starts again. If a key is received, and it is the tonal trigger key, then the system cycles to the next tonal without waiting for the timer to expire 730. If the trigger key is received 740, it indicates the user has selected the tonal character displayed and uses this as a base tonal character, and then uses the steps as shown in FIG. 4 to fine the appropriate accented version of the base tonal character 750. If a non-trigger key is received, the system starts again at A to process the next character.

In at least one embodiment, the pre-defined replacement rules include the replacement based on "sub-roots" of a character string within the inputted character string. This is done to alleviate the typing of the entire character string, as in some languages this would be an onerous task. In this scenario, the second limiter character would be a special limiter character which would denote an incomplete character string.

Based on any of the pre-defined replacement rules, if the automatically generated diacritic-modified character string is not the correct selection, then a substitute diacritic-modified character string may be selected by monitoring the selection of a substitution key entry (also referred to as a trigger key). The substitution key entry may be defined as any key entries (e.g., right or left shift keys) which are enabled once a diacritic-modified character string is initially selected based on pre-defined replacement rules. In at least one embodiment, the substitution key entries are set by the system administrator. In at least one embodiment, the substitution key entries are set by the user.

In at least one embodiment, the inputted character string does not match any entry (e.g., diacritic-modified character string) in the database. In this scenario, each character in the inputted character string may be modified individually with the appropriate diacritic modifier to construct the desired diacritic-modified character string. The selection of the individual diacritics for each character may be selected using similar techniques as noted above for modifying character strings; namely the selection of the diacritic modifiers by the substitution key where the substitution key cycles through each diacritic for the individual character. Once the desired diacritic-modified character string has been constructed, the desired diacritic-modified character string may be included in the database for future use; this is a discretionary option toggled either by the system administrator or the user.

In at least one embodiment, multiple substitution keys may be defined for discrete functions. For example, in Vietnamese there are separation of tonal diacritics and general vowel manipulation diacritics. Each of these functions may be given a separate substitution key entries such that it may be faster to cycle through the separate options.

The language for the system and method is selected at the outset such that the database and other components are configured to match the language selection. In at least one embodiment, the language must be selected manually. In at least one embodiment, the language is detected based on the probability of match of words in a sentence to sub-sets of information within the database. In this way, the system and method would automatically detect the correct sub-set of information from the database (e.g., correct dictionary for language within database).

System Interface

The system may have any interface which allows for selection of language and/or options associated with inputted character string manipulation.

In at least one embodiment, the interface is a graphical user interface (GUI) allowing for selection of the language using conventional means of the device on which the system and method is operating on. For example, a smartphone may utilize touchscreen for language selection and character entry, in contrast to a personal computer using an external standard 108 key keyboard and mouse for language selection and options.

In at least one embodiment, the interface is command prompt based and allows for selection of language and options by means of command prompt.

In at least one embodiment, the interface is audial allowing for language selection and options to be received by audial means including, but not limited to, a microphone.

In at least one embodiment, the interface may be any combination thereof of the options mentioned above. For example, the system and method contemplates an arrangement wherein the information is given via an audial medium and confirmed visually with a speech to text function.

It will be understood that the following example is intended to describe embodiments of the invention and are not intended to limit the invention in any way.

EXAMPLE

Responding to Email in French

An office worker Alex is responding to an email from a foreign client which, although is principally English, requires the integration of a number of French language terms.

Alex enables the diacritic-modified character string program from his personal computer running Microsoft Windows® operating system. The character entry device is an external keyboard. The program is opened with a GUI interface which brings Alex to language selection. Alex selects French.

The program now remains passive to Alex who lets it run in the background. The program monitors keyboard messages through the low level hook facility of Microsoft Windows®.

Alex begins to input the French language strings into his email in Microsoft Outlook® which he types from his previous word "<space>-<c>-<o>-<t>-<e>-<space>". The first "<space>" is seen as the limiter character and engages the method for inputted character string detection. The subsequent characters are logged and finally the second "<space>" character is seen as the second limiter character thereby making an inputted character string with the character keystroke entries monitored in between. This second "<space>" key also allows for the inputted character string "cote" to be replaced by the pre-determined replacement rules, which in this case replaces the string with the probability of the diacritic-modified character string general usage. Therefore the inputted character string "cote" automatically becomes "côte" upon the second "<space>" key.

However, Alex was looking for the word "côte", therefore he hits a substitution key "<left-shift>" which substitutes the string "côte" for "côte".

Alex continues to write in French using the same technique as described above allowing for ease of typing without requiring a multilingual keyboard layout. Once Alex is finished with typing the French language segment, he selects to terminate the program and resumes normal operations.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a processor to execute the methods provided in the embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

The foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

The invention claimed is:

1. A computer-implemented method of manipulating an inputted word to a diacritic-modified word using a keyboard having only a single layout of unique alphabetic keys for each letter of a Latin alphabet, the method comprising:
   monitoring the keyboard for first and second limiters typed by a user of the keyboard, wherein the limiters include one of the space key and punctuation marks;
   identifying the inputted word between the first and second limiters;
   comparing the inputted word to a database containing a plurality of words and their respective diacritical replacements;
   determining if the database contains one or more diacritical replacements for the inputted word;
   if there is only a single diacritical replacement for the inputted word, then:
      automatically replacing the inputted word with the single diacritical replacement;
      monitoring the keyboard for a separately input trigger key consisting solely of a shift key of the keyboard; and
      in response to input received via the trigger key, reverting back from the diacritical replacement to the inputted word;
   and
   if there are multiple diacritical replacements for the inputted word, then:
      monitoring the keyboard for a separately input trigger key consisting solely of a shift key of the keyboard, wherein the trigger key is the shift key pressed by itself;
      prioritizing the multiple diacritical replacements based on pre-defined replacement rules;
      in response to sequential input received via the trigger key, sequentially replacing, in order of priority, the inputted word with each of the multiple diacritical replacements to thereby enable the user to cycle through all of the diacritical replacements corresponding to the inputted word;
   receiving user input setting a language that has tonal diacritical characters;
   in response to setting the language that has tonal diacritical characters, configuring a right shift key to enable user selection of a tonal base character having a first accent and configuring a left shift key to apply a second accent to the tonal base character to thereby provide an accented tonal character having two accents;
   receiving user input via the right shift key to select one of the tonal base characters; and
   receiving user input via the left shift key to select one of a plurality of accents to apply to a selected tonal base character.

2. The method of claim 1 wherein replacing the inputted word with one of the multiple diacritical replacements comprises replacing the inputted word with a most recently used diacritical replacement for the word.

3. The method of claim 1 wherein the pre-defined replacement rules are based on a frequency of usage of the diacritical replacements.

4. The method of claim 1 further comprising adding the inputted word to the database as a new word in response to determining that the inputted word is not contained in the database.

5. The method of claim 1 wherein the database includes N diacritic-modified replacements that correspond to the inputted word, such that possible diacritical replacements comprise the Array A [0, 1, . . . N−1], and wherein said initially replacing step comprises replacing the inputted character string with A[Li], wherein Li represents the last used index for that Array, and wherein said automatically replacing the inputted character string with next possible diacritic modified character string comprises replacing the inputted character string with the string represented by A(Li modulo N), where Li is incremented by one for each timer expiration or trigger key received.

6. A computer system for manipulating an inputted word to a diacritic-modified word using a keyboard having only a single layout of unique alphabetic keys for each letter of a Latin alphabet, the system comprising a processor coupled to a memory, the processor being configured for performing steps of:
   monitoring the keyboard for first and second limiters typed by a user of the keyboard, wherein the limiters include one of the space key and punctuation marks;
   identifying the inputted word between the first and second limiters;
   comparing the inputted word to a database containing a plurality of words and their respective diacritical replacements;
   determining if the database contains one or more diacritical replacements for the inputted word;
   if there is only a single diacritical replacement for the inputted word, then:

automatically replacing the inputted word with the single diacritical replacement;

monitoring the keyboard for a separately input trigger key consisting solely of a shift key of the keyboard, wherein the trigger key is the shift key pressed by itself; and in response to input received via the trigger key, reverting back from the diacritical replacement to the inputted word;

and if there are multiple diacritical replacements for the inputted word, then:

monitoring the keyboard for a separately input trigger key consisting solely of a shift key of the keyboard;

prioritizing the multiple diacritical replacements based on pre-defined replacement rules;

in response to sequential input received via the trigger key, sequentially replacing, in order of priority, the inputted word with each of the multiple diacritical replacements to thereby enable the user to cycle through all of the diacritical replacements corresponding to the inputted word;

receiving user input setting a language that has tonal diacritical characters;

in response to setting the language that has tonal diacritical characters, configuring a right shift key to enable user selection of a tonal base character having a first accent and configuring a left shift key to apply a second accent to the tonal base character to thereby provide an accented tonal character having two accents;

receiving user input via the right shift key to select one of the tonal base characters; and receiving user input via the left shift key to select one of a plurality of accents to apply to a selected tonal base character.

7. The system of claim 6 wherein replacing the inputted word with one of the multiple diacritical replacements comprises replacing the inputted word with a most recently used diacritical replacement for the word.

8. The system of claim 6 wherein the pre-defined replacement rules are based on a frequency of usage of the diacritical replacements.

9. The system of claim 6 further comprising adding the inputted word to the database as a new word in response to determining that the inputted word is not contained in the database.

10. The system of claim 6 wherein the database includes N diacritic-modified replacements that correspond to the inputted word, such that possible diacritical replacements comprise the Array A [0, 1, . . . N−1], and wherein said initially replacing step comprises replacing the inputted character string with A[Li], wherein Li represents the last used index for that Array, and wherein said automatically replacing the inputted character string with next possible diacritic modified character string comprises replacing the inputted character string with the string represented by A(Li modulo N), where Li is incremented by one for each timer expiration or trigger key received.

\* \* \* \* \*